United States Patent [19]

Andrews et al.

[11] Patent Number: 5,570,161
[45] Date of Patent: Oct. 29, 1996

[54] LOW SURFACE ENERGY COATING TO MAINTAIN CLEAN SURFACES OF OPTICAL COMPONENTS IN A DOCUMENT REPRODUCTION MACHINE

[75] Inventors: John R. Andrews, Fairport; Howard A. Mizes, Webster; Daniel E. Kuhman, Fairport; Robert P. Herloski, Webster, all of N.Y.

[73] Assignee: Xerox Corporation, Stamford, Conn.

[21] Appl. No.: 343,145

[22] Filed: Nov. 21, 1994

[51] Int. Cl.[6] ................................................ G03G 21/00
[52] U.S. Cl. ............................................................ 355/215
[58] Field of Search .................................. 355/200, 215, 355/75

[56] References Cited

U.S. PATENT DOCUMENTS

| | | | |
|---|---|---|---|
| 3,936,176 | 2/1976 | Whited | 355/215 X |
| 3,958,877 | 5/1976 | Menon et al. | 355/327 |
| 3,961,848 | 6/1976 | Turner | 355/327 |
| 4,342,043 | 7/1982 | Palermiti et al. | 355/309 X |
| 4,474,457 | 10/1984 | Phelps | 355/230 |
| 4,952,973 | 8/1990 | Jones et al. | 355/84 |
| 5,019,837 | 5/1991 | Schwarz | 346/108 |
| 5,073,785 | 12/1991 | Jansen et al. | 346/1.1 |
| 5,170,267 | 12/1992 | Blitz et al. | 346/475 |

OTHER PUBLICATIONS

J. Mort and F. Jansen, "Plasma Deposited Thin Films," (CRC Press, 1986), pp. 108–109.

Primary Examiner—Fred L. Braun

[57] ABSTRACT

A document reproduction machine having an optical component which is coated with a low surface energy transparent coating to reduce the adhesion of particles on the optical component. During the forming of the coating the lateral conductivity of the coating is modified so as to dissipate electrical charge build up on the coating.

7 Claims, 2 Drawing Sheets

LOW SURFACE ENERGY COATING TO MAINTAIN CLEAN SURFACES OF OPTICAL COMPONENTS IN A DOCUMENT REPRODUCTION MACHINE

BACKGROUND OF THE INVENTION

The present invention relates generally to a document reproduction machine and, more particularly, to an apparatus and method for reducing the effects of airborne contaminants which adhere to the surface of optical components within such a machine, such as mirrors, transparent ROS windows, lenses and the like.

A constant problem in operating a xerographic copier/printer is the need to reduce the effects of airborne contaminants which are unavoidably created during machine operation. These contaminants include toner particles originating in the development station used to develop the latent image formed on a photoreceptor; dust from copy paper transport, particles loosened from the document handler, degraded portions of a doctor blade or transfer roll and the usual dirt and dust from the ambient. One source of image quality degradation is the adhering of the contaminants to the surface of the optical components which are arranged along an optical path to either scan a document and form an image on a CCD array, as in a RIS scanner, or to expose a photoreceptor drum with a modulated radiation pattern generated by a Raster Output Scanner (ROS) system. Examples of the components which may become contaminated are: the bottom surface of the document platen, the mirrors and lenses in a document scanning system and the mirrors and lenses in a ROS system. These components all can accumulate, over time, sufficient contaminants adhering to a surface to reduce exposure at the photoreceptor by partially blocking light reflected from or transmitted through the component. Particles can also reduce contrast in an image exposure profile at a photoreceptor by scattering light reflected from a mirror component.

Various methods of reducing these contamination problems are known in the art. One technique is to establish a positive air flow across the exposed surface to prevent the adhesion of the contaminants. Another expedient is to isolate the components in a housing so as to remove them from the airborne contamination. This is accomplished, for example, by placing the ROS optical scanning components within a ROS housing. The modulated ROS scanning beam then exits the housing by means of a transparent exit window. The transparent exit window, however, is still susceptible to contamination on the outside surface. The air flow solution has been found to be partially effective in removing larger diameter contamination particles (above 10 microns). For smaller particles, the van der Waals force becomes comparable to the electrostatic forces dominating the adhesion of the larger diameter particles to the surface.

It is, therefore, an object of the present invention to reduce the rate at which airborne contaminants are deposited on the surface of optical elements such as mirrors, windows and lenses used in a xerographic reproduction machine.

It is a further object to reduce the contaminant adhesion in a relatively inexpensive manner.

It is a still further object to reduce the adhesion of smaller diameter particles while preventing the adhesion of larger diameter particles by a positive air flow. These and other objects are achieved, in one embodiment, by coating the affected surface with a transparent coating of a material having a low surface energy. In another embodiment, the lateral conductivity of the coating is controlled to increase dissipation of electrostatic surface charge. In a still further embodiment, an air-assist cleaning step is added to improve efficiency. More particularly, the invention relates to a document reproduction machine wherein a plurality of optical components are located within a machine frame and wherein at least one of said optical components has at least one surface subject to adhesion thereon by airborne contamination particles, a method for reducing the adhesion of said particles on said surface comprising the steps of: selecting a material having a low surface energy, and forming a transparent coating of said material on the surface of at least one of said optical components.

DESCRIPTION OF THE INVENTION

Figure 1:
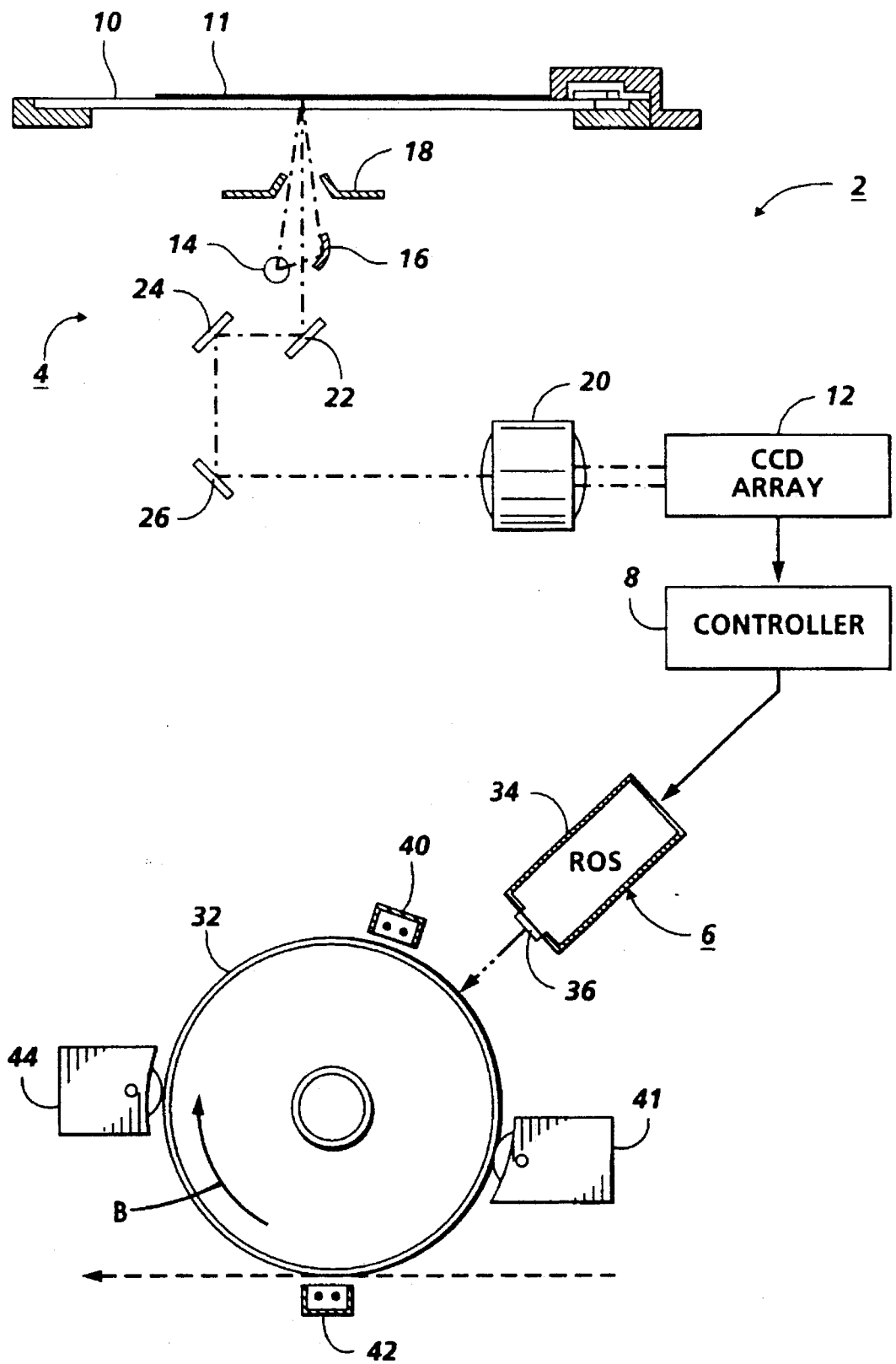
FIG. 1 is a schematic side view of a document printer having a raster input scanner, a raster output scanner and a xerographic print engine.

Referring to FIG. 1, there is shown a printing system 2 of the type described in U.S. Pat. No. 5,170,267 whose contents are hereby incorporated by reference. This system has a RIS 4, a ROS 6 and a controller section 8. A transparent platen 10 provides support for a document 11 to be copied. One or more linear CCD arrays 12 are supported by reciprocating scanning movement below platen 10. RIS 4 comprises a plurality of optical components which move together as a single unit. The components include a linear, fluorescent lamp 14, associated reflector 16 and baffle 18, the latter two elements cooperating to direct a narrow band of light onto an incremental area of the platen. Also included in RIS 4 are a lens 20 and mirrors 22, 24, 26 which cooperate to focus the illuminated line-like segment of platen 10 and the document being scanned thereon, onto array 12. Array 12 produces image signals or pixels representative of the scanned image which are output to controller 8. Controller 8 processes and digitizes the output signals from the array 12. The output of controller 8 operates a ROS 6. ROS 6 incorporates a laser, a rotating polygon scanner and other optical components which generate modulated focused output beams which are scanned across the surface of a photoreceptor 32 to create latent electrostatic images thereon. The ROS components are housed in a housing 34; the scanning beam exits housing 34 through a transparent window 36. An example of ROS 6 is disclosed in U.S. Pat. No. 5,019,837, whose contents are hereby incorporated by reference.

Continuing with the description of the printer, the surface of drum 32 is charged to some uniform level by charge corotron 40. As the drum rotates in the indicated direction, the charged surface is exposed by modulated scanning beams exiting ROS 6 through window 36 to form a latent image on the drum surface. The latent image is developed at station 41 by toner or liquid polarized ink of a specific polarity and the developed image is transferred at station 42 to a copy sheet moving in the direction of arrow B. The transferred image is then fused by means not shown and conveyed to an output tray. The drum is cleaned at a cleaning station 44.

Figure 2:
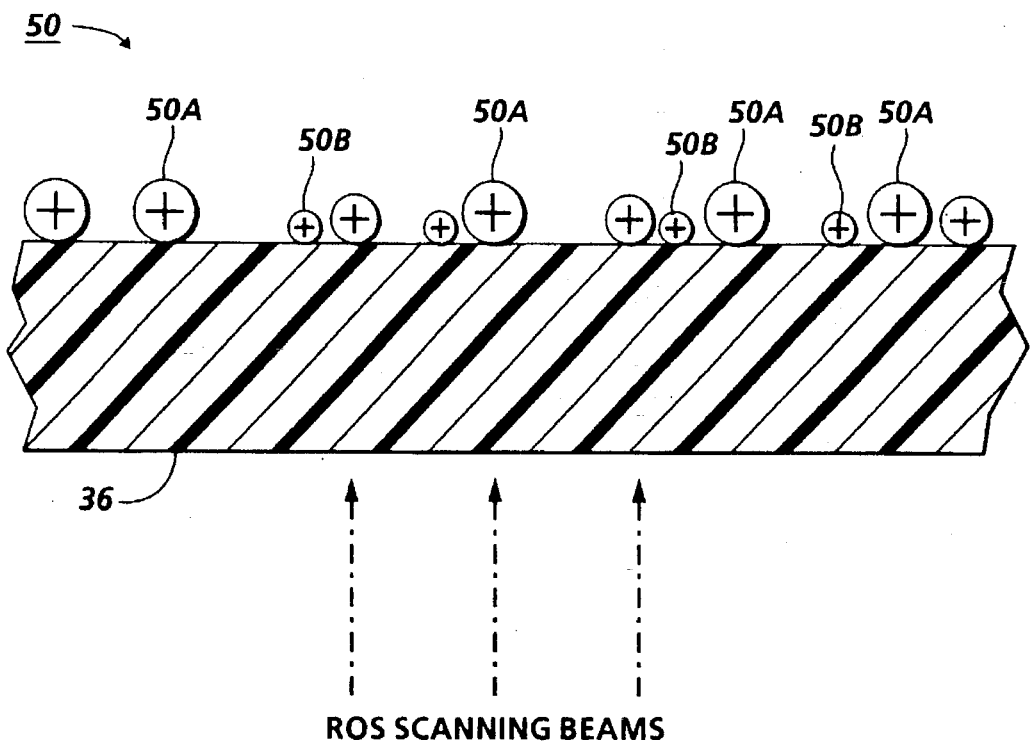
FIG. 2 is a partial side view enlarged of a ROS window having a layer of contaminants adhering to its surface.

It is understood that RIS 4, ROS 6, the drum and other xerographic stations are all housed within a machine frame. As mentioned in the introduction, contaminants from the various xerographic operations (developer, transfer, fusing, cleaning, paper and document handling) become airborne and are carried into various parts of the machine. Other airborne contaminants are dust particles and particles from the paper fibers of the copy sheet. Inevitably, some of the contaminants adhere to surfaces of optical components within the machine frame. These components include but are not limited to the platen 10, the components of the RIS 4, including array 12, reflector 16, lens 20, mirrors 22,24,26. Further optical components which can be affected by the contaminants are the components of the ROS 6, which include the scanner, mirrors, lenses, and window 36 of housing 34. This contamination results in the aforementioned reduction of light transmission and/or light scattering along the optical scanning path of the RIS or the ROS. As one example of contamination of an optical component, FIG. 2 shows the outside surface of ROS housing window 36 with contamination particles adhering to the surface following a period of operation. It is understood that mirrors 22, 24, 26 and the surface of lens 20 may have similar particle adhesion. Since the window 36 is a non-conductive glass, a static charge builds upon the surface during machine operation attracting oppositely charged particles to the surface. Since the primary contamination source will be toner particles originating in developer 41, the particles will be predominately of the toner polarity. However, some non-toner contaminates of a polarity opposite to that of the toner will also adhere to the glass surface. In sum, particle layer 50 will consist of mainly toner particles of positively charged toner having a diameter from 7 to 15 microns and primarily about 8 to 11 microns as well as a smaller number of smaller diameter particles 50B with diameters of less than 3 microns and primarily about 0.1 to about 1 micron. Smaller diameter particles represent the non-toner particle contaminants.

Figure 3:
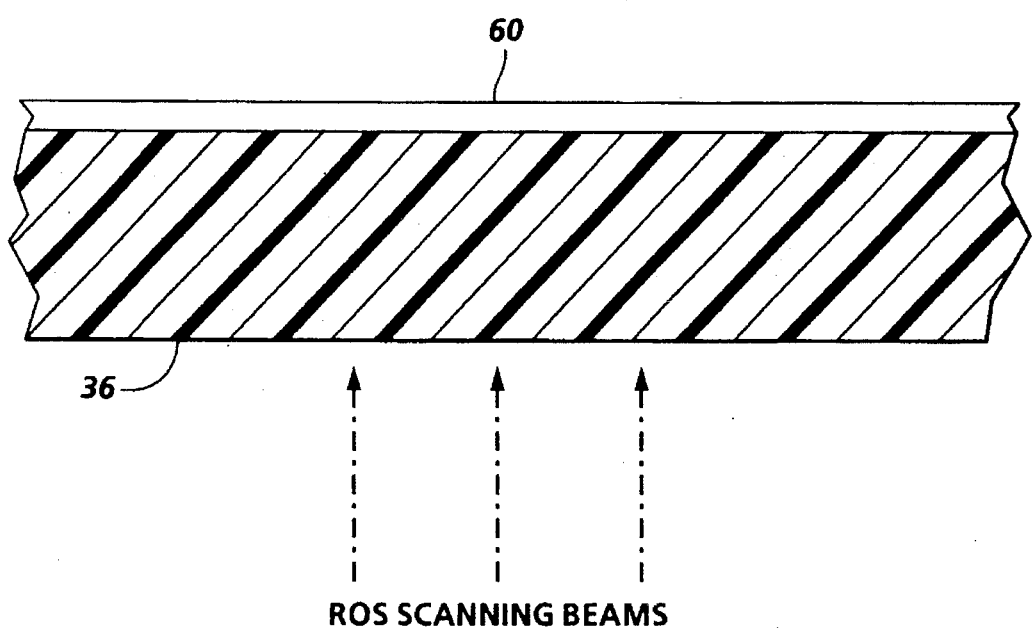
FIG. 3 is a view of the ROS window of FIG. 2 showing a low adhesive coating applied to the surface of the window.

According to the invention, and as shown in FIG. 3, the glass surface of an optical component, for explanatory purposes, the ROS window 36, is coated with a transparent coating 60 of a material having low surface energy and particularly having a surface energy less than 25 dynes/cm. Suitable materials are plasma-enhanced CVD deposited fluorinated diamond-like carbon material or a dip coated polysiloxane material, such as the commercially available Rain-X™, fluoro-silicones and fluoropolymers. The coating 60 is deposited to a thickness of between 0.02 and 10 microns by coating methods which include, but are not limited to, spray and spin coating and physical vapor deposition. Alternative coatings can be created by plasma-enhanced fluorination of organic films such as polyimide and deposition of fluoropolymers, fluoro-silicones, and any other sufficiently low surface energy material coated using the aforementioned methods.

Coating 60 acts to minimize the van der Waals force and capillary forces causing the adhesion of the smaller particles 50B in particle layer 50. In one experiment, layer 60 was a fluorinated diamond-like carbon film deposited by plasma deposition techniques known in the art, for example U.S. Pat. No. 5,073,785 whose contents are hereby incorporated by reference. The window and layer 60 was subjected to a toner cloud; a second uncoated window 36 was subjected to the same toner cloud. Each of the two windows was subjected to a mild air flow with the transmission through the window chosen as the baseline for measuring light transmission through the window and the remaining toner on the window surface. The untreated window had a transmission of 75%, whereas the coated window had a transmission of 99%. This test demonstrated that the air flow was successful in removing the larger diameter toner particles 50A adhering to the surface by electrostatic attraction while the film reduced the adhesion of the smaller diameter particles 50B. Together the two steps reduced the effects of contamination to 1%.

From the above, it is apparent that the low energy coating alone is useful in reducing the rate of adherence of contaminants to a surface, but that the usage is enhanced by combining with a second non-contacting cleaning method such as an air flow.

In a further embodiment of the invention, the electrostatic charge build-up on the surface of an optical component that attracts charged particles can be reduced by controlling the lateral conductivity of coating 60. It has been found that lateral conductivity within certain ranges reduces the electrostatic attraction by dissipating the surface charge. The electrostatic charge of particles already attracted to the surface is also reduced, improving the efficiency of the air-assisted cleaning. As an example, if a fluorinated carbon film is used as the coating, the conductivity can be varied through modifications in the deposition process as described in Plasma Deposited Thin Films, edited by J. Mort and F. Jansen (CRC Press, 1986) specifically pages 108–109, whose contents are incorporated by reference. If evaporated or sputtered carbon films are used, room temperature conductivities of about 0.1 to 0.001 $(\Omega\text{-cm})^{-1}$ can be obtained. For plasma deposited films, the conductivity depends on the growth conditions, particularly deposition temperature and degree of energetic ion bombardment during film growth. Room temperature conductivity values ranging from $10^{-5}$ to $10^{-16}$ $(\Omega\text{-cm})^{-1}$ have been obtained. It is possible to plasma fluorinate these materials to obtain the required surface energy properties while maintaining the desired level of electrical conductivity.

While the embodiment disclosed herein is preferred, it will be appreciated from this teaching that various alternative, modifications, variations or improvements therein may be made by those skilled in the art, which are intended to be encompassed by the following claims:

What is claimed:

1. In a document reproduction machine wherein a plurality of optical components are located within a machine frame and wherein at least one of said optical components has at least one surface subject to adhesion thereon by airborne contamination particles, a method for reducing the adhesion of said particles on said surface comprising the steps of:

selecting a material having a low surface energy and a lateral conductivity, forming a transparent coating of said material on the surface of at least one of said optical components, and modifying the lateral conductivity of said coating during said forming step so as to dissipate electrical charge build up on said coating.

2. The method of claim 1 further including the step of at least periodically directing an air flow across the coating formed on the surface of said optical component.

3. The method of claim 1 wherein said material is selected from a group consisting of fluoro-silicone, poly-siloxane, and fluoropolymer.

4. The method of claim 3 wherein said fluoro-silicone is a surface fluorinated organic material.

5. The method of claim 4, wherein said fluorinated organic material is a polyimide.

6. The method of claim 5 wherein said fluorinated organic material is a diamond-like carbon.

7. The method of claim 6 further including the step of modifying the lateral conductivity of said diamond-like carbon to produce a lateral conductivity of about 0.1 to 0.001 $(ohm/cm)^{-1}$.

* * * * *